Patented Feb. 1, 1949

2,460,574

UNITED STATES PATENT OFFICE 2,460,574

VINYL CHLORIDE POLYMERS PLASTICIZED WITH DIALKYL CHLOROPHTHALATES

Thomas L. Gresham, Akron, Ohio, assignor to The B. F. Goodrich Company, New York, N. Y., a corporation of New York No Drawing. Application April 5, 1945, Serial No. 586,819

8 Claims. (Cl. 260—31.8)

This invention relates to vinyl resin compositions and pertains more specifically to the plasticization of such compositions.

It is well known that the vinyl resins and in particular, gamma polyvinyl chloride, that is high-molecular-weight polyvinyl chloride, or any polymer made largely from vinyl chloride or vinylidene chloride, may be plasticized with various materials among which are tricresyl phosphate, dibutyl phthalate, dioctyl phthalate, and other similar materials. The plasticized compositions are rubber-like materials which find a wide variety of uses, among the most important of which is for electrical insulation. Although the compositions have been satisfactory for all ordinary uses, many attempts have been made to improve the electrical resistivity of the composition by incorporating a variety of stabilizing agents or the like in the plasticized material.

I have now discovered that plasticized compositions having an extremely high electrical resistivity, as well as extraordinary resistance to aging, may be prepared by employing a particular class of materials as the plasticizing agent. Moreover, it has been found that these new compositions have a very much greater flame resistance than do the compositions previously known. This class of materials consists of the esters of the chlorophthalic acids having the following structure:

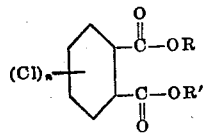

where $n$ is an integer from 1 to 4 and R and R' are functionally aliphatic hydrocarbon groups, the total number of carbon atoms in both R and R' being between 7 and 23. The term "functionally aliphatic hydrocarbon groups" is intended to include not only alkyl groups, but other hydrocarbon groups which have the functional characteristics of alkyl groups, such as aralkyl groups.

The desired esters may be prepared by any of the four standard methods of esterification. For example, the desired chlorophthalic acid may be heated with the appropriate alcohol in the presence of a small amount of mineral acid as a catalyst; or if desired, a chlorophthalic acid chloride may be reacted with the appropriate alcohol in the presence of alkali. Esters of any of the chlorophthalic acids, that is, of mono-, di-, tri-, or tetra-chlorophthalic acids, may be employed. Among the esters which I have found to be satisfactory plasticizers are the following: the di-n-butyl, di-sec-butyl, di-tert.-butyl, di-n-amyl, di-n-hexyl, di-(2-ethylhexyl), di-n-decyl, di-sec.-decyl, di-n-undecyl, di-cyclohexyl, or dibenzyl, mono-, di-, tri-, or tetra-chlorophthalates. Mixed esters of the chlorophthalic acids may also be employed, such as the butyl cetyl, 2-ethylhexyl lauryl, methyl n-octadecyl, and other similar chlorophthalates. Mixtures of esters of monochlorophthalic acid with esters of dichlorophthalic acid and other similar mixtures may also be used.

The compositions of my invention have many uses as rubber substitutes, and are particularly valuable for use as electrical insulation or other applications where flame-resistance is important. The compositions may be prepared by any of the usual methods, such as by mixing on a hot roll mill, or in an internal mixer. Compositions of varying physical properties may be prepared, depending upon the proportion of plasticizer and other ingredients used. I prefer to employ from 25 to 300 parts by weight of plasticizer for each 100 parts by weight of polymer. Pigments and fillers such as clay, barytes, carbon black, whiting, etc., which are in common use in the rubber and plastic industries may be used in my composition. In order to obtain special properties, other plasticizers may also be used in the same composition, as well as stabilizers and other materials commonly employed in such compositions.

There may be plasticized in accordance with this invention any resin which is made by the polymerization of a monomeric material comprising a chloroethylene containing from one to two chlorine atoms on one only of the carbon atoms, such as vinyl chloride, vinylidene chloride, mixtures of these two materials with each other, or mixtures of one or both with minor proportions of other monomers copolymerizable therewith such as vinyl bromide, vinyl cyanide, vinyl acetate, vinyl propionate, vinyl butyrate, methyl acrylate, methyl methacrylate, methyl ethacrylate, ethyl methacrylate, maleic acid or anhydride, esters of maleic or of chloromaleic acid, esters of crotonic acid, and other similar copolymerizable materials. By "minor proportion" is meant less than 50% by weight of the total monomeric material. Polymers made from monomeric materials consisting substantially of vinyl chloride form a preferred class of the vinyl resins within the broad scope of the invention.

In order to describe more fully the nature of my compositions, I have compared their properties with those of similar compositions made with phthalic acid esters as plasticizers, since the phthalic acid esters are the plasticizers of the prior art which most nearly resemble my new plasticizers. The following compositions were prepared, in which the parts are by weight.

|  | A | B | C | D |
|---|---|---|---|---|
| Gamma-polyvinyl chloride | 100 | 100 | 100 | 100 |
| Di-(2-ethylhexyl) phthalate | 52 |  | 52 |  |
| Di-(2-ethylhexyl) monochlorophthalate |  | 55.8 |  | 56 |
| Lead silicate | 10 | 10 |  |  |
| Basic Lead carbonate |  |  | 10 | 10 |
| Clay |  |  | 7 | 7 |

Slightly different amounts of the two different plasticizers were used in the various compositions in order to give materials having about the same properties of hardness and stiffness. The compositions were subjected to accelerated aging conditions by heating in a hot air oven at 130° C., and the electrical resistivity of the compositions was measured at varying intervals of time, as shown in the following table:

| Days at 130° C. | Resistivity at 70° C. in ohm-cm.×10⁻⁹ | | | |
|---|---|---|---|---|
|  | A | B | C | D |
| 1 | 529 | 910 | 4,220 | 6,260 |
| 6 | 314 | 901 | 366 | 624 |
| 15 |  |  | 262 | 506 |
| 21.7 | 5.2 | 985 |  |  |
| 29.8 |  |  | 12.4 | 95.8 |

Other compositions were prepared using a different grade of polyvinyl chloride, as shown in the following table, in which the parts are by weight:

|  | E | F |
|---|---|---|
| Gamma-polyvinyl chloride | 100 | 100 |
| Di-(2-ethylhexyl) phthalate | 52 |  |
| Di-(2-ethylhexyl) dichlorophthalate |  | 63 |
| Basic lead carbonate | 10 | 10 |
| Clay | 7 | 7 |

The resistivity of these compositions was measured after 15 days aging at 130° C. when composition E had a resistivity of 124 ohm-cm.×10⁻⁹ while composition F had a resistivity of 260 ohm-cm.×10⁻⁹. Particularly good results were also obtained with di-n-butyl tetrachlorophthalate in gamma-polyvinyl chloride compositions. All of these compositions containing chlorophthalates had a remarkably high flame resistance as compared to similar compositions containing phthalic acid esters. Even a small amount of the chlorophthalates, when added to a composition plasticized with other materials, produced a noticeable improvement in flame resistance. Similar results may be obtained with other plasticizers within the scope of this invention, as well as with other polymers which are made by the polymerization of a monomeric material comprising vinyl chloride or vinylidene chloride.

Although I have herein disclosed specific embodiments of my invention, I do not intend to limit myself solely thereto, but to include all of the obvious variations and modifications falling within the spirit and scope of the appended claims.

I claim:

1. A composition comprising gamma-polyvinyl chloride plasticized with di-(2-ethylhexyl) monochlorophthalate.

2. A composition comprising gamma-polyvinyl chloride plasticized with di-(2-ethylhexyl) dichlorophthalate.

3. A composition comprising gamma-polyvinyl chloride plasticized with di-n-butyl tetrachlorophthalate.

4. A composition comprising polyvinyl chloride plasticized with a dialkyl chloro-phthalate containing a total of between 7 and 23 carbon atoms in the two alkyl groups.

5. A composition comprising polyvinyl chloride plasticized with a dialkyl monochloro-phthalate containing a total of between 7 and 23 carbon atoms in the two alkyl groups.

6. A composition comprising polyvinyl chloride plasticized with a dialkyl dichloro-phthalate containing a total of between 7 and 23 carbon atoms in the two alkyl groups.

7. A composition comprising polyvinyl chloride plasticized with a dialkyl tetrachloro-phthalate containing a total of between 7 and 23 carbon atoms in the two alkyl groups.

8. A composition comprising a polymer of monomeric material in which each monomer present is a chloroethylene having from 1 to 2 chlorine atoms on one only of the carbon atoms and having only hydrogen atoms attached to the remaining valences of the carbon atoms, plasticized with a dialkyl chloro-phthalate containing a total of between 7 and 23 carbon atoms in the two alkyl groups.

THOMAS L. GRESHAM.

REFERENCES CITED

The following references are of record in the file of this patent:

UNITED STATES PATENTS

| Number | Name | Date |
|---|---|---|
| 1,972,092 | Graves | Sept. 4, 1934 |
| 2,062,403 | Dreyfus | Dec. 1, 1936 |
| 2,398,882 | Clark | Apr. 23, 1946 |